U.S. Patent Office — 3,385,756
Patented May 28, 1968

3,385,756
METHODS OF DESTROYING INSECTS WITH NITRO-SUBSTITUTED SALICYLANILIDES
Jack D. Early, Bethesda, Md., and John P. Chupp, Kirkwood, Mo., assignors to Monsanto Company, St. Louis, Mo., a corporation of Delaware
No Drawing. Continuation-in-part of application Ser. No. 462,127, June 7, 1965. This application Mar. 22, 1966, Ser. No. 536,256
6 Claims. (Cl. 167—31)

ABSTRACT OF THE DISCLOSURE

Compounds characterized by a 2'-chloro-4'-nitrosalicylanilido nucleus useful as insecticides.

---

This application is a continuation-in-part of copending application Ser. No. 462,127, filed June 7, 1965, and now abandoned.

This invention relates to new and pesticidally useful substituted 2'-chloro-4'-nitrosalicylanilides of the formula:

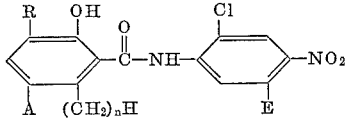

wherein $n$ is an integer from 0 to 1, wherein A is halogen of atomic weight in the range of 35 to 80 (that is chloro or bromo, but preferably chloro), wherein E is chloro or, and preferably hydrogen, and wherein R is alkyl containing from 3 to 8 carbon atoms specifically isopropyl or $C_{4-8}$ tert.alkyl of the formula:

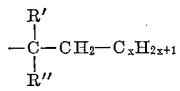

wherein R' and R" respectively are straight chain (or linear) alkyl and respectively satisfy the empirical formula $C_mH_{2m+1}$ wherein $m$ is a whole number from 1 to 3, inclusive, and wherein $x$ is an integer from 0 to 4, but preferably 0. It is preferred that R be $C_{4-6}$ tert.alkyl such as tert.butyl, tert.pentyl, 1,1-dimethyl-n-butyl and 1-ethyl-1-methyl-n-propyl. As illustrative of other variants of R are 1,1-dimethyl-n-pentyl, 1,1-dimethyl-n-hexyl, 1,1-dimethyl-isoamyl, 1,1,3,3-tetramethyl-n-butyl, 1-ethyl-1-methyl-n-butyl and 1,1-diethyl-n-butyl.

The compounds of this invention are prepared by reacting substantially one mole of a 2-chloro-4-nitroaniline of the formula:

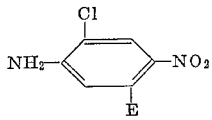

wherein E has the afore-described significance with substantially one mole of a substituted 5-halosalicylic acid of the formula:

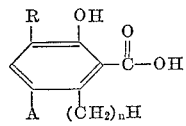

wherein $n$, A and R have the afore-described significance in the presence of from about 0.33 to about 1.0 mole of phosphorus trichloride and an inert organic liquid (e.g. benzene, toluene, xylene, chlorobenzene, dichlorobenzene, chlorotoluene, trichlorobenzene, and the like, and mixtures thereof) at a temperature above the freezing point of the reaction system up to and including the system's boiling point, however, in general the reaction temperature will be in the range of from about 60° C. to about 200° C. The substituted 2'-chloro-4'-nitrosalicylanilide end products are solids and are insoluble in water.

As illustrative of the 5-halosalicylic acid precursors are 3-isopropyl-5-chlorosalicylic acid (M.P. 169–170° C.), 3-tert.butyl-5-chlorosalicylic acid (M.P. 220–222° C.), 6-methyl-3-tert.butyl-5-chlorosalicylic acid (M.P. 208–211° C.), 3-tert.pentyl-5-chlorosalicylic acid (M.P. 195–198° C.), 6-methyl-3-tert.butyl-5-bromosalicylic acid (M.P. 170–173° C.), 3-(1,1-dimethyl-n-butyl)-5-chlorosalicylic acid (M.P. 154.5–155° C.), 3-(1-ethyl-1-methyl-n-propyl)-5-chlorosalicylic acid (M.P. 152–154° C.), 6-methyl-3-(1,1-dimethyl-n-butyl)-5-chlorosalicylic acid (M.P. 154.5–156° C.), 3-tert.butyl-5-bromosalicylic acid (M.P. 230–231.5° C.), and 3-(1,1,3,3-tetramethyl-n-butyl)-5-chlorosalicylic acid (M.P. 145–147° C.). The salicylic acid precursors for these 5-halosalicylic acids are either known materials or readily prepared by initially ortho-alkylating phenol or m-cresol with the appropriate olefin in accordance with the procedure of Stroh et al., Angew. Chem., vol. 69, pp. 699–706 (1957) to provide the substituted phenol

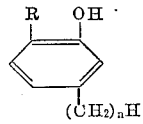

wherein R and $n$ have the afore-described significance (many of these substituted phenols are commercially available) and then carboxylating with carbon dioxide in the presence of aqueous sodium hydroxide in accordance with the Schmitt modification of the Kolbe synthesis (German Patents 29,939 and 38,742) and thereafter acidifying the sodium salt so produced. These salicylic acids are readily halogenated in the 5-position thereof employing chlorine or bromine in the presence of glacial acetic acid.

As illustrative of the compounds of this invention and their preparation but not limitative thereof is the following:

EXAMPLE I

To a suitable reaction vessel equipped with a thermometer, agitator and reflux condenser is charged 8.6 parts by weight of 3-isopropyl-5-chlorosalicylic acid (M.P. 169–170° C.) and 55 parts by weight of chlorobenzene. The so charged mass is heated to about 70° C. and thereto is added with agitation 6.9 parts by weight of 2-chloro-4-nitroaniline followed by 2.5 parts by weight of phosphorus trichloride in 55 parts by weight of chlorobenzene. The reaction mass is then refluxed (about 135° C.) for five hours. The mass is then cooled to about 70° C. whereupon and with agitation is added 50 parts by weight of water followed by 50 parts by weight of 20 percent hydrochloric acid. The organic layer is separated and washed first with water then with dilute aqueous sodium bicarbonate and finally with water. The so washed organic mass is then stripped of volatiles under vacuum. The residue upon recrystallization from benzene gave 3-isopropyl-2',5-dichloro-4'-nitrosalicylanilide, M.P. 120–121° C.

Other illustrative examples of the compounds of this invention (Examples II to XIII below) as well as certain homologs, isomers and analogs thereof (Examples A to M below) for purposes of demonstrating this invention prepared by the same procedure as in Example I but substituting the appropriate substituted salicylic acid and appropriate substituted aniline in the same molecular proportions are summarized in tabular form below.

Example No.:
- II — 3 - tert.butyl - 2′,5-dichloro-4′-nitrosalicylanilide (M.P. 159–160° C.).
- III — 6 - methyl - 3 - tert.butyl-2′,5-dichloro-4′ - nitrosalicylanilide (M.P. 153–155° C.).
- IV — 3 - tert.pentyl - 2′,5 - dichloro-4′-nitrosalicylanilide (M.P. 136–137° C.).
- V — 6 - methyl - 3-tert.pentyl-2′,5-dichloro-4′ - nitrosalicylanilide (M.P. 108.5–110.5° C.).
- VI — 6 - methyl - 3 - tert.butyl - 2′-chloro-5-bromo - 4′ - nitrosalicylanilide (M.P. 170°–173° C.).
- VII — 3 - (1,1-dimethyl-n-butyl)-2′,5-dichloro-4′-nitrosalicylanilide.
- VIII — 3 - (1 - ethyl - 1-methyl-n-propyl)-2′,5-dichloro - 4′-nitrosalicylanilide (M.P. 143–143.5° C.).
- IX — 6 - methyl - 3-(1,1-dimethyl-n-butyl)-2′,5-dichloro-4′-nitrosalicylanilide (M.P. 78–81° C.).
- X — 6 - methyl - 3-tert.butyl-2′,5,5′-trichloro-4′ - nitrosalicylanilide (M.P. 138.5–140° C.).
- XI — 3 - tert.butyl - 2′,5,5′ - trichloro-4′-nitrosalicylanilide (M.P. 208.5–210° C.).
- XII — 3 - tert.butyl-2′-chloro-5-bromo-4′-nitrosalicylanilide (M.P. 172.5–174.5° C.).
- XIII — 3 - (1,1,3,3 - tetramethyl-n-butyl)-2′,5-dichloro - 4′-nitrosalicylanilide (M.P. 146–148° C.).
- A — 2′,5 - dichloro - 4′ - nitrosalicylanilide (U.S. 3,147,300).
- B — 3 - methyl - 2′,5-dichloro-4′-nitrosalicylanilide (M.P. 244–246° C.).
- C — 3 - ethyl - 2′,5-dichloro-4′-nitrosalicylanilide (M.P. 202–203° C.).
- D — 3 - tert.pentyl - 2′,5-dichloro-4′-bromosalicylanilide (M.P. 144–144.5° C.).
- E — 3 - tert.butyl - 2′,5 - dichloro-4′-bromosalicylanilide (M.P. 168–169° C.).
- F — 3 - tert.butyl - 4′,5-dichloro-2′-nitrosalicylanilide (M.P. 159.5–160° C.).
- G — 6 - methyl - 3 tert.butyl - 2′,5 - dichloro-5′ - nitrosalicylanilide (M.P. 135–137° C.).
- H — 5 - tert.butyl - 2′,3-dichloro-4′-nitrosalicylanilide (M.P. 220–223° C.).
- J — 3 - tert.butyl - 3′,5-dichloro-4′-nitrosalicylanilide (M.P. 207.5–208.5° C.).
- K — 3 - tert.butyl - 2′,5-dichloro-5′-nitrosalicylanilide (M.P. 184–186° C.).
- L — 2′,3,5 - trichloro - 4′-nitrosalicylanilide (M.P. 229–230° C.).
- M — 5 - (1,1,3,3 - tetramethyl-n-butyl)-2′,3-dichloro - 5′-nitrosalicylanilide (M.P. 157–158° C.).

Although the salicylanilides of this invention are useful per se in destroying a variety of pests, it is preferable that they be supplied to the pests or to the environment of the pests in a dispersed form in a suitable extending agent. The exact concentration of the salicylanilides of this invention employed in destroying pests can vary considerably provided the required dosage (i.e. toxic or pesticidal amount) thereof is supplied to the pests or to the environment of the pests. When the extending agent is a liquid or mixture of liquids (e.g. as in solutions, suspensions, emulsions, or aerosols) the concentration of the salicylanilide employed to supply the desired dosage generally will be in the range of 0.001 to 50 percent by weight. When the extending agent is a semi-solid or solid, the concentration of the salicylanilide employed to supply the desired dosage generally will be in the range of 0.1 to 25 percent by weight. From a practical point of view, the manufacturer must supply the user with a low cost concentrate or spray base or particulate solid base in such form that, by merely mixing with water or finely divided inert solid extender (e.g. powdered clay or talc) or other low cost material available to the user at the point of use, he will have an easily prepared pesticidal spray or particulate solid. In such a concentrate composition, the salicylanilide generally will be present in a concentration of 5 to 95 percent by weight, the residue being any one or more of the well known pesticidal adjuvants, such as the surface-active clays, solvents, diluents, carrier media, adhesives, spreading agents, humectants, and the like, but particularly a finely divided solid extender.

There are a large number of organic liquids which can be used for the preparation of solutions, suspensions or emulsions of the salicylanilides of this invention. For example, isopropyl ether, acetone, methyl ethyl ketone, octanone, dioxane, cyclohexanone, carbon tetrachloride, ethylene dichloride, tetrachloroethane, hexane, heptane and like higher liquid alkanes, hydrogenated naphthalenes, solvent naphtha, benzene, toluene, xylene, petroleum fractions (e.g. those boiling almost entirely under 400° F., and having a flash point above about 80° F., particularly kerosene), mineral oils having an unsulfonatable residue above about 80 percent and preferably above about 90 percent. In those instances wherein there may be concern about the phytotoxicity of the organic liquid extending agent a portion of same can be replaced by such low molecular weight aliphatic hydrocarbons as dipentene, diisobutylene, propylene trimer, and the like or suitable polar organic liquids such as the aliphatic ethers and the aliphatic ketones containing not more than about 10 carbon atoms as exemplified by acetone, methyl ethyl ketone, diisobutyl ketone, dioxane, isopropyl ether, and the like. In certain instances, it is advantageous to employ a mixture of organic liquids as the extending agent, e.g. an aromatic hydrocarbon and an aliphatic ketone.

When the salicylanilides of this invention are to be supplied to the pests or to the environment of the pests as aerosols, it is convenient to dissolve them in a suitable solvent and disperse the resulting solution in dichlorodifluoromethene or like chlorofluoroalkane which boils below room temperature at atmospheric pressure.

The salicylanilides of this invention are preferably supplied to the pests or to the environment of the pests in the form of emulsions or suspensions. Emulsions or suspensions are prepared by dispersing the salicylanilides of this invention either per se or in the form of an organic solution thereof in water with the aid of a water-soluble non-ionic or anionic or cationic surfactant or mixtures thereof. The term "surfactant" as employed here and in the appended claims is used as in volume II of Schwartz, Perry and Berch's "Surface Active Agents and Detergents" (1958, Interscience Publishers, Inc., New York) in place of the expression "emulsifying agent," to connote generically the various "emulsifying agents," "dispersing agents," "wetting agents" and "spreading agents" that are adapted to be admixed with the active compounds of this invention in order to secure better wetting and spreading of the active ingredients in the water vehicle or carrier in which they are insoluble through lowering the surface tension of the water (see also Frear "Chemistry of Insecticides, Fungicides and Herbicides," second edition, page 280). The surfactants contemplated are the well-known capillary active substances which are non-ionic or anionic or cationic and which are described in detail in volumes I and II of Schwartz, Perry and Berch's "Surface Active Agents and Detergents" (1958, Interscience Publishers, Inc., New York), and also in the November 1947 issue of Chemical Industries (pages 811–824) in an article entitled "Synthetic Detergents" by John W. McCutcheon and also in the July, August, September and October, 1952 issues of Soap and Sanitary Chemicals under the title "Synthetic Detergents." The disclosures of these articles with respect to non-ionizing capillary active substances are incorporated in this specification by reference in order to avoid unnecessary enlargement of this specification. The preferred surfactants are the water soluble anionic and non-ionic surface active agents set forth in U.S. 2,846,398 (issued Aug. 5, 1958).

The salicylanilides of this invention can be dispersed by suitable methods (e.g. tumbling or grinding) in solid extending agents either of organic or inorganic nature and supplied to the pests environment in particulate form. Such solid materials include for example, tricalcium phosphate, calcium carbonate, kaolin, bole, kieselguhr, talc, bentonite, fuller's earth, pyrophillite, diatomaceous earth, calcined magnesia, volcanic ash, sulfur and the like inorganic solid materials, and include for example, such materials of organic nature as powdered cork, powdered wood, and powdered walnut shells. The preferred solid carriers are the adsorbent clays, e.g. bentonite. These mixtures can be used for pesticidal purposes in the dry form, or by addition of water-soluble anionic or cationic or non-ionic surfactants the dry particulate solids can be rendered wettable by water so as to obtain stable aqueous dispersions or suspensions suitable for use as sprays.

For special purposes the salicylanilides of this invention can be dispersed in a semi-solid extending agent such as petrolatum with or without the aid of solubility promoters and/or surfactants.

In all of the forms described above the dispersions can be provided ready for use in combatting pests or they can be provided in a concentrated form suitable for mixing with or dispersing in other extending agents. As illustrative of a particularly useful concentrate is an intimate mixture of a salicylanilide of this invention with a water-soluble anionic or non-ionic surfactant or mixtures thereof which lowers the surface tension of water in the weight proportions of 0.1 to 15 parts of surfactant with sufficient of the salicylanilide of this invention to make 100 parts by weight. Such a concentrate is particularly adapted to be made into a spray for combatting various forms of pests by the addition of water thereto. As illustrative of such a concentrate is an intimate mixture of 20 parts by weight of 3-tert.pentyl-2',5-dichloro-4'-nitrosalicylanilide and 2 to 4 parts by weight of a water-soluble non-ionic surfactant such as the polyoxyethylene derivatives of $C_{8-12}$ alkyl substituted phenols such as nonylphenol or dodecylphenol.

Another useful concentrate adapted to be made into a spray for combatting pests is a solution (preferably as concentrated as possible) of a salicylanilide of this invention in an organic solvent therefor. The said liquid concentrate preferably contains dissolved therein a minor amount (e.g. 0.5 to 10 percent by weight of the weight of the new pesticidal agent) of a non-ionic or anionic surfactant, which surfactant is also water-soluble. As illustrative of such a concentrate is a solution of 3-tert.pentyl-2',5-dichloro-4'-nitrosalicylanilide in a mixture of xylene and 2-octanone which solution contains dissolved therein a water-soluble non-ionic surfactant such as the polyoxyethylene derivatives of $C_{8-12}$ alkyl substituted phenols such as nonylphenol and dodecylphenol.

In all of the various dispersions described hereinbefore for pesticidal purposes the active ingredient can be one or more of the salicylanilides of this invention. The salicylanilides of this invention can also be advantageously employed in combination with other pesticides, including, for example, nematocides, bactericides, and herbicides. In this manner it is possible to obtain mixtures which are effective against a wide variety of pests and other forms of noxious life.

In the destruction of pests the salicylanilides of this invention either per se or compositions comprising same are supplied to the pests or to their environment in a toxic or pesticidal amount. This can be done by dispersing the new pesticidal agent or pesticidal composition comprising same in, on or over an infested environment or in, on or over an environment the pests frequent, e.g. agricultural soil or other growth media or other media attractable to the pests for habitational or sustenance or propagational purposes, in any conventional fashion which permits the pests to be subject to the pesticidal action of the salicylanilides of this invention. Such dispersing can be brought about by applying sprays or particulate solid compositions to a surface infested with the pests or attractable to the pests, as for example, the surface of an agricultural soil or other habitat media such as the above ground surface of host plants by any of the conventional methods, e.g. power dusters, boom and hand sprayers, and spray dusters. Also for sub-surface application such dispersing can be carried out by simply mixing the new pesticidal agent per se or pesticidal spray or particulate solid compositions comprising same with the infested environment or with the environment the pests frequent, or by employing a liquid carrier for the new pesticidal agent to accomplish sub-surface penetration and impregnation therein.

The salicylanilides of this invention, especially those of the foregoing formula wherein R is $C_{4-6}$ tert.alkyl, are insecticidally active. To illustrate their activity but not limitative thereof the following insecticidal evaluations were employed:

(a) Mosquito (larvae).—A base solution of the salicylanilide to be evaluated (itemized in Table I) is prepared by dissolving 0.1 gram thereof in sufficient acetone to provide a 1.0% by weight solution of the salicylanilide. 0.05 ml. of this solution is pipetted into each of three 25 x 200 mm. culture tubes which respectively contained sufficient distilled water to provide concentrations in parts per million (p.p.m.) of 10, 2 and 0.2 of the salicylanilide. Each tube is stoppered with an acetone washed rubber stopper and shaken vigorously to facilitate complete mixing. Thereupon approximately 25 early instar yellow fever mosquito larvae (Aedes aegypti) are transferred to each one of the tubes with the aid of a pipette. The larvae are then held in the respective tubes at room temperature for 24 hours at which time mortality observations are taken. The results (based on an average of these replicates of approximately 25 larvae per salicylanilide) obtained are set forth in Table I in percent larvae killed at the respective concentrations of 10, 2 and 0.2 parts per million:

(b) Plum curculio (adult).—Respective solutions of the salicylanilide to be evaluated (itemized in Table I) are prepared by dissolving same in sufficient acetone to provide respective concentrations of the salicylanilide of 10 and 1 micrograms per microliter. One microliter of one of these solutions via a microinjection apparatus is applied directly to the ventral side of the abdomen of each of 10 adula plum curculio (Conotrachelus nenuphar), and one microliter of the other solution via a microinjection apparatus is applied to the ventral side of the abdomen of each of 10 other adult plum curculio (Conotrachelues nenuphar). After the application each insect is released within observation dishes and held for 24 hours at room temperature at which time mortality observations are taken. The results (based on an average of two replicates of 10 insects per salicylanilide) obtained are set forth in Table I in percent adult killed at respective concentrations in micrograms per adult of 10 and 1:

(c) Housefly (adult).—A base solution of the salicylanilide to be evaluated (itemized in Table I) is prepared by dissolving 0.10 gram of the salicylanilide in 10 ml. of acetone. To respective portions of this solution is added sufficient distilled water containing 0.01% by weight of isooctylphenyl polyethoxyethanol nonionic surfactant to provide mixtures having respective concentrations of the salicylanilide of 10 and 1 micrograms per microliter. One microliter of one of these mixtures via a microinjection apparatus is applied directly to the thorax of each of 5 adult female houseflies (*M. domestica*) individually placed in 5 plastic tubes, and one microliter of the other mixture via a microinjection apparatus is applied directly to the thorax of each of 5 other adult female houseflies (*M. domestica*) individually placed in 5 plastic tubes. After the application the insects are held in the plastic tubes at room temperature for 24 hours at which time mortality observations are taken. The results (based on an average of 5 insects per salicylanilide) are set forth in Table I in percent adult killed at respective concentrations in micrograms per adult of 10 and 1:

effectively the salicylanilides of this invention are applied to growing plants, e.g. by spraying the foliage with an aqueous dispersion containing from about 0.01 to about 1.0 percent by weight of the salicylanilide, which dispersion will usually contain based on the salicylanilide from 1 to 15 percent by weight of a non-ionic emulsifier. The amount of the aqueous dispersion usually employed will be that which completely wets the leaves of the plant. Greater or lesser concentrations can be used depending upon the particular insect of this order which is to be combatted, variations in spraying techniques, weather conditions and the like. During the dormant period, such as during the winter time, a salicylanilide of this invention in the form of a solution thereof, as for example in acetone, can be applied to the bark of trees, shrubs, and

TABLE I

| Cpd. of Ex. | Mosquito larvae, percent killed at a conc. in p.p.m. of— | | | Housefly, percent killed at a conc. in micrograms per adult of— | | Plum curculio, percent killed at a conc. in micrograms per adult of— | |
|---|---|---|---|---|---|---|---|
| | 10 | 2 | 0.2 | 10 | 1 | 10 | 1 |
| I | 80 | 10 | 0 | | | 30 | 0 |
| II | 100 | 100 | 70 | 100 | 100 | 100 | 100 |
| III | 100 | 100 | 40 | 100 | 100 | 90 | |
| IV | 100 | 100 | 70 | 100 | 100 | 100 | 80 |
| V | 100 | 100 | 50 | 100 | 100 | | |
| VI | 100 | 100 | 50 | 100 | 100 | | |
| VII | 100 | 100 | 70 | 100 | 80 | 100 | 100 |
| VIII | 100 | 60 | 20 | 100 | 80 | | |
| IX | 60 | 50 | 0 | 100 | 100 | 60 | 30 |
| X | 100 | 20 | 0 | 100 | 60 | 60 | 60 |
| XI | 70 | 60 | 20 | | | 30 | 0 |
| XII | 70 | 30 | 0 | | 40 | 60 | 40 |
| XIII | 60 | 30 | 0 | 100 | 20 | 30 | 0 |
| A | 0 | 0 | 0 | 0 | 0 | 30 | 0 |
| B | 0 | 0 | 0 | 0 | 0 | 0 | 0 |
| C | 40 | 0 | 0 | 0 | 0 | 0 | 0 |
| D | 0 | 0 | 0 | 0 | 0 | 0 | 0 |
| E | 0 | 0 | 0 | 0 | 0 | 0 | 0 |
| F | 0 | 0 | 0 | 0 | 0 | 0 | 0 |
| G | 0 | 0 | 0 | 60 | 0 | 0 | 0 |
| H | 20 | 0 | 0 | 0 | 0 | 0 | 0 |
| J | 50 | 0 | 0 | 0 | 0 | 0 | 0 |
| K | 0 | 0 | 0 | | | 0 | 0 |
| L | 0 | 0 | 0 | 0 | 0 | 30 | 0 |
| M | 0 | 0 | 0 | 0 | 0 | 0 | 0 |

The salicylanilides of this invention are particularly useful in combatting members of the order of insect life Homoptera which includes aphids and the like, which cause considerable agricultural and horticultural damage and as illustrative of such insecticidal properties of the salicylanilides of this invention as compared to analogues thereof is the following:

(d) 10 adult pea aphids (*Macrosiphum pisi*) are placed on leaves of growing pea plants initially sprayed with an aqueous dispersion of the salicylanilide to be evaluated having a concentration in percent by weight as set forth in Table II (this dispersion is prepared by dissolving in 10 ml. acetone sufficient of the salicylanilide to make a 1.0% by weight solution thereof to which solution is added based on the weight of the solution 0.02% of isooctylphenyl polyethoxyethanol nonionic surfactant and thereafter is added sufficient distilled water to give the concentration as set forth in Table II). 48 hours after spraying mortality observations are taken. The results (based on an average of two replicates of 10 insects per salicylanilide) for each salicylanilide are set forth in Table II:

TABLE II

| Salicylanilide | Percent Kill at a Conc. in percent by weight of— | | |
|---|---|---|---|
| | 0.1 | 0.05 | 0.01 |
| 2',5-dichloro-4'-nitrosalicylanilide | 0 | 0 | |
| 3-methyl-2',5-dichloro-4'-nitrosalicylanilide | 0 | 0 | |
| 3-isopropyl-2',5-dichloro-4'-nitrosalicylanilide | 100 | 100 | 30 |
| 3-tert. butyl-2',5-dichloro-4'-nitrosalicylanilide | 100 | 100 | 40 |
| 3-tert. pentyl-2',5-dichloro-4'-nitrosalicylanilide | 100 | 100 | 40 |
| 3-tert. butyl-2',5-dichloro-5'-nitrosalicylanilide | 10 | 0 | |

In combatting members of the insect order Homoptera the like beneath which these insects gather. Other salicylanilides of this invention which are also highly effective in combatting members of the insect order Homoptera include the respective salicylanilides of Examples VI, VII, X and XII. Each of these compounds exhibited an $LD_{50}$ (that is the concentration in micrograms per insect giving a 50% kill) of less than 0.02 microgram per pea aphid employing in substance the insecticidal evaluation procedure of (d) above. In contrast employing the same procedure the salicylanilides of Examples A and B respectively exhibited an $LD_{50}$ of greater than 0.1 microgram per pea aphid.

The salicylanilides of this invention are effective against the strawberry spider mite (*Tetranychus atlanticus*). For example 3-tert.pentyl-2',5-dichloro-4' - nitrosalicylanilide (the compound of Example IV) exhibited on $LD_{50}$ of 0.07 microgram per adult mite on contact therewith whereas in contrast employing the same procedure the salicylanilides of Examples A and B respectively exhibited an $LD_{50}$ of greater than 0.1 microgram per adult mite on contact therewith.

The salicylanilides of this invention are also effective in combatting the Mexican bean beetle (*Epilachna varivestis*). For example in a systemic insecticidal evaluation each of the salicylanilides of Examples II, III, IV, VI, VII, X and XII exhibited an $LD_{50}$ in the range of 0.07 to 0.0025 microgram per adult whereas in contrast in the same systemic insecticidal evaluation the salicylanilides of Examples A and B respectively exhibited an $LD_{50}$ of greater than 0.1 microgram per adult.

The salicylanilides of this invention are also effective in combatting southern armyworm larvae (*Prodenia eridania*). For example at a concentration of 10 microgram per larvae when applied to lima bean leaves infested with this larvae 100% kills were observed employing the salicylanilides of Examples II to XIII inclusive.

In a feeding insecticidal evaluation the salicylanilides of Examples II and IV exhibited effective control of the cotton boll weevil.

The embodiments of the invention in which an exclusive property or privilege is claimed are defined as follows:

1. A method of destroying insects which comprises subjecting the insects to an insecticidally toxic amount of a substituted 2'-chloro-4'-nitrosalicylanilide of the formula

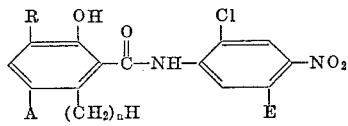

wherein $n$ is an integer from 0 to 1, wherein A is halogen of atomic weight in the range of 35 to 80, wherein E is selected from the group consisting of hydrogen and chloro, and wherein R contains from 3 to 8 carbon atoms and is selected from the group consisting of isopropyl and $C_{4-8}$ tert.alkyl of the formula

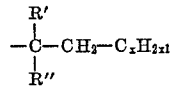

wherein R' and R'' respectively are straight chain alkyl of the formula $C_mH_{2m+1}$ wherein $m$ is a whole number from 1 to 3, and wherein $x$ is an integer from zero to 4.

2. A method of destroying insects in accordance with claim 1 where in the formula of the recited substituted 2'-chloro-4'-nitrosalicylanilide A is chloro, E is hydrogen, R contains from 4 to 6 carbon atoms and is $C_{4-6}$ tert. alkyl, and $x$ is zero.

3. A method of destroying insects in accordance with claim 1 where in the formula of the recited substituted 2'-chloro-4'-nitrosalicylanilide $n$ is zero, A is chloro, E is hydrogen and R is tert.pentyl.

4. A method of destroying insects in accordance with claim 1 where in the formula of the recited substituted 2'-chloro-4'-nitrosalicylanilide $n$ is zero, A is chloro, E is hydrogen, and R is tert.butyl.

5. A method of destroying insects in accordance with claim 1 where in the formula of the recited 2'-chloro-4'-nitrosalicylanilide $n$ is one, A is chloro, E is hydrogen, and R is tert.butyl.

6. A method of destroying insects in accordance with claim 1 where in the formula of the recited 2'-chloro-4'-nitrosalicylanilide $n$ is one, A is chloro, E is hydrogen, and R is tert.pentyl.

References Cited

UNITED STATES PATENTS 3,079,297   2/1963   Schraufstatter _____ 167—31

ALBERT T. MEYERS, *Primary Examiner.*

S. J. FRIEDMAN, *Assistant Examiner.*